United States Patent
Barkan

(10) Patent No.: US 9,672,360 B2
(45) Date of Patent: *Jun. 6, 2017

(54) SECURE COMPUTER ARCHITECTURES, SYSTEMS, AND APPLICATIONS

(71) Applicant: Mordecai Barkan, Palo Alto, CA (US)

(72) Inventor: Mordecai Barkan, Palo Alto, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/606,992

(22) Filed: Jan. 27, 2015

(65) Prior Publication Data

US 2015/0143482 A1 May 21, 2015

Related U.S. Application Data

(63) Continuation-in-part of application No. 14/040,352, filed on Sep. 27, 2013, now Pat. No. 9,092,628.

(60) Provisional application No. 61/965,313, filed on Jan. 28, 2014, provisional application No. 61/744,677, filed on Oct. 2, 2012.

(51) Int. Cl.
*G06F 21/00* (2013.01)
*G06F 21/57* (2013.01)
*G06F 21/31* (2013.01)
*G06F 21/32* (2013.01)
*H04L 29/06* (2006.01)

(52) U.S. Cl.
CPC ............ *G06F 21/57* (2013.01); *G06F 21/31* (2013.01); *G06F 21/32* (2013.01); *H04L 63/14* (2013.01); *G06F 2221/034* (2013.01)

(58) Field of Classification Search
CPC combination set(s) only.
See application file for complete search history.

(56) References Cited

U.S. PATENT DOCUMENTS

| | | |
|---|---|---|
| 6,289,462 B1 | 9/2001 | McNabb et al. |
| 6,321,337 B1 * | 11/2001 | Reshef .................... G06F 21/53 726/14 |
| 6,574,234 B1 | 6/2003 | Myer et al. |
| 6,630,942 B2 | 10/2003 | Gerra et al. |
| 6,651,171 B1 | 11/2003 | England et al. |
| 7,484,008 B1 | 1/2009 | Gelvin et al. |
| 7,593,530 B2 | 9/2009 | Karaoguz et al. |
| 7,685,281 B1 | 3/2010 | Saraiya et al. |

(Continued)

FOREIGN PATENT DOCUMENTS

| | | |
|---|---|---|
| DE | 102011012227 A1 | 8/2012 |
| EP | 1161715 | 12/2001 |

(Continued)

OTHER PUBLICATIONS

The Nizza Secure-System Architecture |https://os.inf.tu-dresden.de/papers_ps/nizza.pdf| Hohmuth et al. |pp. 1-10|2005.*

(Continued)

*Primary Examiner* — Mahfuzur Rahman
(74) *Attorney, Agent, or Firm* — Carr & Ferrell LLP

(57) ABSTRACT

Secure computer architectures, systems, and applications are provided herein. An exemplary system includes a legacy environment which is an off-the-shelf computing system, a trusted environment device that communicates with a network, and at least one peripheral that is communicatively coupled with the trusted environment device or having an authentication module.

16 Claims, 11 Drawing Sheets

(56) References Cited

U.S. PATENT DOCUMENTS

| | | | |
|---|---|---|---|
| 7,942,844 | B2 | 5/2011 | Moberg et al. |
| 8,073,008 | B2 | 12/2011 | Mehta et al. |
| RE43,103 | E | 1/2012 | Rozman et al. |
| 8,149,102 | B1 | 4/2012 | Miller et al. |
| 8,151,324 | B2* | 4/2012 | Burch .................... G06F 21/34 709/225 |
| RE43,500 | E | 7/2012 | Rozman et al. |
| 8,627,414 | B1 | 1/2014 | McCune et al. |
| 8,782,222 | B2 | 7/2014 | Luna et al. |
| 9,092,628 | B2 | 7/2015 | Barkan |
| 9,268,959 | B2* | 2/2016 | Paczkowski ............ G06F 21/74 |
| 9,342,695 | B2 | 5/2016 | Barkan |
| 2002/0111946 | A1* | 8/2002 | Fallon .................... G06Q 10/10 |
| 2003/0025599 | A1 | 2/2003 | Monroe |
| 2004/0268135 | A1* | 12/2004 | Zimmer ................ G06F 21/575 713/189 |
| 2005/0288877 | A1 | 12/2005 | Doig et al. |
| 2006/0010134 | A1 | 1/2006 | Davis et al. |
| 2006/0107328 | A1 | 5/2006 | Frank et al. |
| 2007/0067844 | A1 | 3/2007 | Williamson et al. |
| 2007/0147619 | A1* | 6/2007 | Bellows ................. H04L 41/28 380/277 |
| 2007/0189308 | A1 | 8/2007 | Tchigevsky et al. |
| 2009/0094439 | A1 | 4/2009 | Mansell et al. |
| 2009/0125895 | A1 | 5/2009 | Majoros |
| 2009/0164770 | A1 | 6/2009 | Zimmer et al. |
| 2009/0220080 | A1* | 9/2009 | Herne ................. H04L 63/0428 380/255 |
| 2009/0249053 | A1 | 10/2009 | Zimmer et al. |
| 2009/0307142 | A1 | 12/2009 | Mardikar |
| 2010/0005531 | A1 | 1/2010 | Largman et al. |
| 2010/0031325 | A1 | 2/2010 | Maigne et al. |
| 2010/0151817 | A1 | 6/2010 | Lidstrom et al. |
| 2010/0281273 | A1 | 11/2010 | Lee et al. |
| 2011/0197188 | A1 | 8/2011 | Srinivasan et al. |
| 2011/0320823 | A1 | 12/2011 | Saroiu et al. |
| 2012/0030731 | A1 | 2/2012 | Bhargava et al. |
| 2012/0102334 | A1 | 4/2012 | O'Loughlin et al. |
| 2012/0159156 | A1 | 6/2012 | Barham et al. |
| 2012/0215956 | A1 | 8/2012 | Zeng et al. |
| 2013/0166552 | A1* | 6/2013 | Rozenwald ......... G06F 17/3071 707/737 |
| 2014/0096226 | A1 | 4/2014 | Barkan |
| 2015/0067864 | A1 | 3/2015 | Barkan |
| 2015/0312253 | A1 | 10/2015 | Barkan |
| 2016/0191555 | A1 | 6/2016 | Barkan |

FOREIGN PATENT DOCUMENTS

| | | |
|---|---|---|
| EP | 1901145 | 3/2008 |
| EP | 1901146 | 3/2008 |
| EP | 2904743 A2 | 8/2015 |
| WO | WO0016206 | 3/2000 |
| WO | WO2014055372 | 4/2014 |
| WO | WO2015102730 | 7/2015 |

OTHER PUBLICATIONS

International Search Report and Written Opinion mailed Apr. 15, 2014 in Patent Cooperation Treaty Application No. PCT/US2013/062490, filed Sep. 27, 2013.

ARM Security Technology: Building a Secure System usingTrustZone Technology; PRD29-GENC-009492C; 2009.

Ramasubramanian, Rahul. Exploring Virtualization Platforms for ARM-based Mobile Android Devices; 2011.

Greene, James. Intel Trusted Execution Technology: Hardware-based Technology for Enhancing Server Platform Security. 2012.

Strongin, Geoffrey. Trusted computing using AMD "Pacifica" and "Presidio" secure virtual machine technology. Information Security Technical Report (2005) 10, 120-132.

Santos et al. Towards trusted cloud computing. Proceedings of the 2009 conference on Hot topics in cloud computing. 2009. https://www.usenix.org/legacy/event/hotcloud09/tech/full_papers/santos.pdf.

International Search Report and Written Opinion mailed Jul. 6, 2015 in Patent Cooperation Treaty Application No. PCT/US2014/061235, filed Oct. 17, 2014.

Perrig et al. SPINS: Security Protocols for Sensor Networks, Wireless Networks, vol. 8, 521-534. 2002. http://www.csee.umbc.edu/courses/graduate/CMSC691A/Spring04/papers/spins-wine-journal.pdf.

Extended European Search Report mailed Apr. 21, 2016 in European Patent Application No. 13844473.2 filed Sep. 27, 2013, 5 pages.

Steinberg, Udo et al., "NOVA: A Microhypervisor-Based Secure Virtualization Architecture", EuroSys '10, Apr. 13-16, 2010, pp. 209-222.

Sadeghi, Ahmad-Reza et al., "Enabling Fairer Digital Rights Management with Trusted Computing," Horst-Gortz-Institute for IT-Security, Ruhr-University Bochum, Germany 2007, pp. 53-70.

* cited by examiner

SECURE COMPUTER ARCHITECTURES, SYSTEMS, AND APPLICATIONS

CROSS REFERENCE TO RELATED APPLICATIONS

This application is a continuation-in-part of U.S. patent application Ser. No. 14/040,352, filed on Sep. 27, 2013, now U.S. Pat. No. 9,092,628, issued Jul. 28, 2015, and titled "Secure Computer Architectures, Systems, and Applications," which claims the priority benefit of U.S. Provisional Application Ser. No. 61/744,677, filed on Oct. 2, 2012 and titled "Computer Architecture, System and Applications," and this application claims the benefit and priority of U.S. Provisional Patent Application Ser. No. 61/965,313 filed on Jan. 28, 2014 and titled "Add-on To Existing Computing Systems to Enhance Their Security," all of which are hereby incorporated by reference herein in their entireties, including all references cited therein.

FIELD OF THE TECHNOLOGY

Embodiments of the disclosure relate to computer security. More specifically, but not by way of limitation, the present technology provides secure computing architectures, systems, and applications. In some embodiments, the present technology employs both trusted and legacy hardware environments that protect sensitive user information and increase data security, privacy, and safety.

SUMMARY OF THE DISCLOSURE

According to some embodiments, the present technology is directed to a system, comprising: (a) a legacy environment comprising an off-the-shelf computing system; (b) a trusted environment device that communicates with a network and the legacy environment; and (c) at least one peripheral is communicatively coupled with the trusted environment device or comprising an authentication module.

According to other embodiments, the present technology is directed to a system, comprising: (a) a mobile computing device; and (b) a trusted environment device that can communicatively couple with the mobile computing device, the trusted environment device being configured to communicate with a network which the mobile computing device is attempting to access, the trusted environment device preventing the mobile computing device from executing a malicious attack on the network.

According to additional embodiments, the present technology is directed to a corporate network, comprising: (a) a corporate administrator system and a corporate server providing a corporate network; (b) a plurality of end user computing systems that couple to the corporate network; and (c) the corporate administrator system, the corporate server, and each of the plurality of end user computing systems comprising a trusted environment device, the trusted environment device being configured to: (i) communicate with the corporate network; and (ii) prevent the execution of a malicious attack on the corporate network.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that can be readily apparent to those of ordinary skill in the art having the benefit of the description herein.

DETAILED DESCRIPTION

Figure 1:
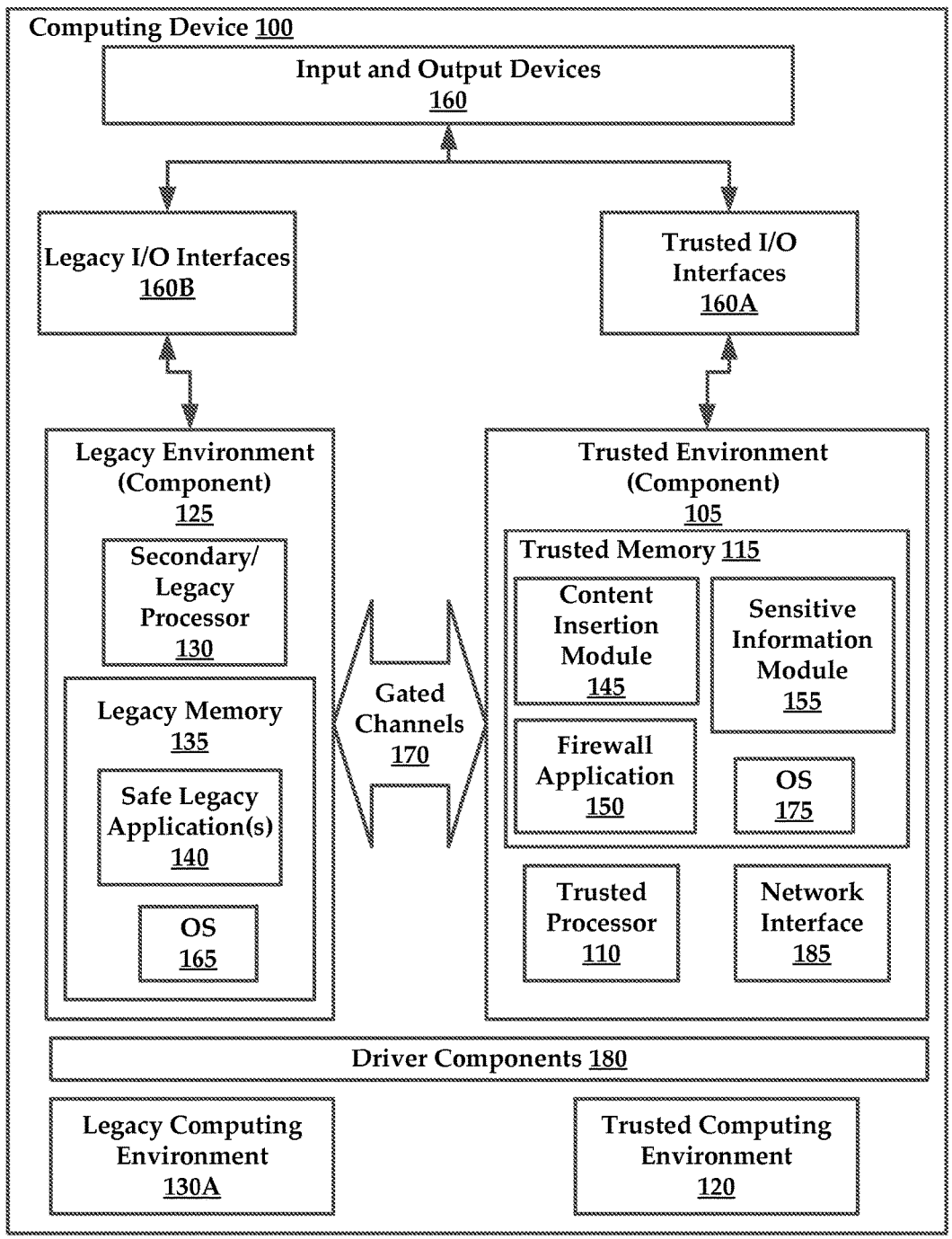
FIG. 1 is an exemplary computing device having a trusted environment and a legacy environment, the computing device being constructed in accordance with the present disclosure.

In the following description, for purposes of explanation, numerous specific details are set forth in order to provide a thorough understanding of the disclosure. It can be apparent, however, to one skilled in the art, that the disclosure may be practiced without these specific details. In other instances, structures and devices are shown at block diagram form only in order to avoid obscuring the disclosure.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

The terminology used herein is for the purpose of describing particular embodiments only and is not intended to be limiting of the invention. As used herein, the singular forms "a", "an" and "the" are intended to include the plural forms as well, unless the context clearly indicates otherwise. It can be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

Advantageously, the present technology remedies the vulnerability of existing computing device, for example, legacy computers such as personal computers (PCs), notebooks, smartphones, and so forth. Vulnerabilities are caused by placing the processor and operating system (OS) of the computing device as the central computing component, which is exposed to each operation executed by the computing device.

Further, it is difficult, if not impossible to protect these legacy systems when a user encounters or downloads malware into the system. In non-limiting examples, malware may masquerade as a legitimate user by copying authentication information of the user, often without their knowledge. Also, the malware may transfer information to remote locations and expose sensitive information of the user to fraudsters. The above scenario is merely exemplary and many types of malware such as spoofing, phishing, Trojan horses, man-in-the-browser attacks, and other fraud-driven or malicious activities that would be known to one of ordinary skill in the art are also remedied by the present technology.

Indeed, these vulnerabilities may be overcome by abandoning a single CPU (processor and OS) computing architecture. The present technology contemplates computing architectures, systems, and devices that include a plurality of computing environments that are physically and/or logically separated from one another in such a way that the security, privacy, and safety of the users sensitive information is preserved.

As is used throughout this disclosure, the term "sensitive information" may include any information that is input into, processed by, output from, or transmitted by a computing device that impacts the security, privacy, or safety of a user or device. Sensitive information may be understood to include personal information, personally identifiable information, intellectual property, or any other information that could be used in a malicious manner, which would be known to one of ordinary skill in the data privacy and data security arts. Exemplary and non-limiting examples of sensitive information can be described in greater detail infra, with reference to various exemplary use cases for the present technology.

In some embodiments, the present technology may be embodied in a computing device that provides a trusted computing environment and one or more legacy computing environments. The trusted computing environment is generated by a trusted environment/component, which contains a hardware portion such as a central processing unit (CPU) and a software portion having an OS, application program interface (API)/drivers, and optional trusted applications, which will be described in greater detail herein.

A legacy environment/component is similar in structure to a conventional computing architecture and system, and generates a legacy computing environment. A more complete description of an exemplary legacy computing device is described with reference to FIG. 6, which is described infra. In general, the legacy environment contains a hardware portion such as a central processing unit (CPU) and a software portion having an OS, API/drivers, and one or more applications. In some embodiments, the legacy computing device may execute one or more safe applications (e.g., applications from trusted sources).

The present technology leverages the use of more than one CPU in a single computing device to create a trusted computing environment, which is physically separated from a legacy computing environment. The trusted environment is tasked with managing, monitoring, and controlling, of the global operation of the computing device, as well as the operations of the legacy computing environment. The trusted computing environment is protected from malware downloaded to, or executed within, the legacy environment(s) of the computing device due to the physical separation between the trusted and legacy hardware. In some instances, all downloads of content from a network occur in the legacy environment.

At least a portion (or potentially all) administrative tasks of the computing device can be carried out within the trusted computing environment such as managing all or some of the APIs of the I/O devices. Exemplary input devices include a keyboard, mouse, touch screens, GPS modules, modems (wireless and wired), camera, microphones, biometric sensors, joy sticks, and other similar I/O devices that would be known to one of ordinary skill in the art. Exemplary output devices include, but are not limited to, displays, speakers, and similar devices that manage, all or some of portion of the memory or mass storage of the computing device, such as disk and other memory storage devices. The trusted computing environment also all or a portion of the sensitive information utilized by the computing device such as authentication data, usernames/passwords, account numbers, email lists, file directories, favorites, "start menu settings", encryption keys, private information, and so forth. This sensitive information may reside in the trusted environment of the system, on a user held storage device, or on a network or network device.

The trusted computing environment may process all or some of the user input information, received from various input devices, to the legacy computing environment. The trusted computing environment may monitor and control the access of the legacy computing environment to all or some of the output devices such as the displays, speakers, memory devices (e.g., disks, memory sticks, DVDs), USB ports, and any network devices or computing devices that are external to the computing device of the present technology.

In some embodiments, a single trusted computing environment may control several legacy computing environments. The trusted environment may have network access through a network interface that utilizes a static or dynamically assigned IP address. This IP address is not known or utilized by the legacy computing environment for security and privacy purposes.

Data transmitting through a network interface on IP addresses that are used by a legacy computing environment may be controlled and monitored by the trusted environment. The combined trusted/legacy architecture prevents a legacy computing environment from modifying or altering portions of the trusted computing environment. A certain implementation, for example, may include a legacy environment that runs safe applications such as word processing applications, spreadsheet applications, and web browser clients, all of which are preferably created by reputable entities.

It will be understood that the legacy computing environment itself is treated as non-trusted, by the trusted computing environment. A second legacy computing environment may execute other applications, such as those downloaded from a network, in order to minimize damage to the computing device that may be caused by malware downloaded from the network. That is, only the legacy environment may be damaged by the execution of non-trusted applications since it is the only part of the computing device that can be infected. Indeed, in some embodiments, one or more legacy computing environments may execute within another legacy computing environment.

The trusted environment and the legacy environment that runs the safe applications may not be infected, particularly if the two legacy environments are not executed by the same processor that provides the trusted environment, namely the trusted processor.

A trusted computing environment may be a simple computing environment with only limited functionality. In some instances the operations of the trusted environment are not modifiable. In other instances, the trusted computing environment may be layered and provide one or more fixed parts, and may be modifiable to some extent. Regardless of the modifiability of the trusted computing environment, it is advantageous to prevent the trusted computing environment from being modified by a legacy computing environment. In some instances, modification of the trusted environment may be allowed by a remote network resource, such as the trusted computing environment of another computing device, such as a web server, that has been verified as a trusted entity. In any case the trusted environment is limited in accessibility to the network, for example to a single site on the Internet.

In some instances, authentication of a user can be carried in the trusted environment. Having the owner of the computing device as the administrator and user may simplify the use of the computing device. Optionally, additional users may be allowed access to the computing device only by the owner. In some instances users with external devices, such as a USB memory stick may be allowed to interface directly with the trusted computing environment and use the computing device.

In general, all login actions for such access as virtual private network (VPN), web-based email service, social networks, websites, web-based accounts, other external computing devices, and so forth can be carried out in the trusted computing environment without exposure of such sensitive information to the legacy computing environment. In some instances, the trusted computing environment may utilize biometric identifiers to identify a user.

In some instances, the trusted computing environment includes a trusted browser client that operates entirely within the trusted computing environment. The browser client may utilize the secure and dedicated network interface and/or IP address of the trusted computing environment.

In some embodiments, if malware is executed in the legacy computing environment, attempts by the malware to operate as the user can be tested by the trusted environment which evaluates user actions. By way of example, if the user keys by means of the keyboard, a password to be used with a network entity (such as Internet site or corporate server) without a communication of such site, such actions may be indicative of malware presence and the password string of characters will blocked from accessing the legacy environment. Furthermore, the malware operation may be tested by messaging the user and by providing a coded string (process called seeding) that will allow future identification of future use of the fake password by a hackers or such, which could point at machine, user, time and other data, that will help in tracing, locating, and containing the malware source. By way of example, if a key stroke is emulated by the malware such keystrokes can be identified by the trusted computing environment as a malware initiation and not a user key stroke. For example, the trusted environment may know that a keystroke could not have been executed by the user. As result the action could be denied or redirected by the trusted computing environment.

The present technology can also provide protection to peripheral devices that rely on private or secret codes, such as network switches and routers or any other device that a hacker might attempt to gain control of using credentials of the user. The present technology allows both the credentials and operating control of the switch/router to reside within the trusted computing environment, shielded from the legacy computing environment(s) in which the malware resides.

Exemplary computing devices that may incorporate and utilize the present technology include, but are not limited to robots, satellites, components of communication systems, smart sensors, machine-to-machine devices, although any computing device or system that utilizes a processor and memory may likewise benefit from the present technology.

The combined use of the trusted and legacy computing environments ensures that hacking attempts execute and terminate within in the legacy computing environment. Thus, legacy computing environments may be structured with full featured modified copies of the administrative components used by typical legacy systems. The legacy computing environment may be allowed by the trusted computing environment to masquerade as an unprotected computer. Using the legacy computing environment as a foil, the trusted computing environment can seed a hacker with false information that can allow the hacker to be tracked and identified.

Information that can be seeded may include, but is not limited to user identifiers, passwords, account numbers, email addresses, corrupted files, malware, and more. Keyboard strokes can be modified and fed to the legacy computing environment, as well as mouse positions, images, biometric data and any other input and/or output signals. Thus, the information that the hacker obtains and uses, such as user identifiers or email addresses, can identify the computing device that has been infiltrated, time of action as well as the hacker's computing device. With regard to a time of action, the trusted environment may be configured to identify a time of action for operations occurring within a legacy environment. These operations may be time stamped by the trusted environment. When a malicious event within the legacy environment is suspected or identified, operations occurring around the time of the suspected or confirmed event may be evaluated and interpreted by the trusted environment or a central site.

In some instances, hardware modifications to the computing device may be incorporated as an integrated circuit (IC) that encompasses the legacy CPU(s) and some of the hardware separation of the trusted from the legacy computing environments is implemented at the device level. IC manufacturers may redesign their devices to implement the present technology and reduce the cost of such implementation. With respect to the shielding portions of a computing device from the legacy computing environments, such as video devices and audio devices, may be designed with separate inputs that are dedicated for a trusted computing environment and some that are dedicated for a legacy computing environment. Indeed, the devices may be designed to prevent legacy computing environments from having access to critical information displayed, processed, and/or output by the device.

The present technology may likewise be utilized with network components to provide secure web services, network monitoring, and secure cloud development environment allowing for the gathering of information from a multitude of users, early discovery of threats, certification, anti-hacking means (e.g., avoidance, tracking, study hacking attempts, identify sources of threats, defeating, and retaliating), and other similar features. Since the user serves as a contact end between the trusted and legacy computing environments, the network may serve as the other contact point. The trusted computing environment may channel all network-based communications through the monitoring site, which itself includes a trusted computing environment.

Software components of the present technology may include operating systems and trusted and legacy applications, which may be optimized to execute with the computing devices of the present technology. Specialized tools may be developed to program and test such software. For example, a computing device of the present technology may be utilized as a simulator or emulator. To explain the changes that can allow applications to take advantage of the present technology, several examples will be discussed in greater detail below.

For example, an email client may be modified in such a way that an address book for the email client is maintained in a trusted computing environment. The legacy computing environment may be utilized to maintain general email forms and otherwise generate the content of the email such as the body or attachments. The trusted computing environment may add an email address to the email form only before the email is transmitted. Again, the composition and generation of the bulk of the email document may occur in the legacy computing environment. On the other hand, it is possible to protect the content of the email by creating it in the trusted environment and employ encryption in the trusted environment. Other examples of applications may include a calendar where content of the calendar is maintained in the trusted computing environment, and calendar forms are managed in the legacy computing environment. Additionally, location or positioning data for the computing device, obtained from a GPS module or another positioning module may be managed in the trusted computing environment, whereas maps or other forms are managed within the legacy computing environment and then combined by overlaying the trusted environment data or video over the video provided by the legacy environment, shielding the sensitive data from the legacy environment access.

The exchange of data and files (such as images or graphics), between two or more applications may be securely accomplished by allowing the trusted environment to operate as an interface between the two applications (e.g., a picture from any application may be inserted in a power point presentation) without direct communication between the two applications. In sum, the trusted computing environment acts as a proxy between the two applications.

When the data is displayed, printed, or faxed, the trusted environment can add the relevant information while the computing intensive operations of preparing the bulk of the document are executed within the legacy computing environment.

As mentioned above, the present technology can be applied to server farms, the corporate server environment, and cloud computing environments. By accessing the cloud with the trusted environment, the security of the cloud environment is increased greatly. It is noteworthy that in many cases, central systems are infiltrated from an end user computing device that is directly coupled with the cloud or through a network, such as the Internet.

These and other advantages of the present technology can be described in greater detail below with reference to the collective drawings.

FIG. 1 is a schematic diagram of an exemplary computing device 100, constructed in accordance with the present technology. Generally, the computing device 100 includes a trusted environment 105 having a trusted processor 110 and a trusted memory 115 for storing executable instructions. The trusted processor 110 executes the instructions stored in trusted memory 115 to provide a trusted computing environment 120 that performs computing functions that could expose the computing device 100 to a security risk. Exemplary computing functions that could expose the computing device to a security risk includes any of the aforementioned processes, and generally any operation or process that utilizes sensitive information. The trusted computing environment 120 also stores sensitive information for the user in a manner that shields the sensitive information from a legacy environment 125.

The legacy environment 125 includes a secondary/legacy processor 130 that is physically separated from the trusted processor 110. The legacy environment 125 also includes a legacy/secondary memory 135 for storing executable instructions. The secondary/legacy processor 130 executes the instructions to provide a legacy computing environment 130A that manages computing functions of the computing device 100 that are exposed to unsecure environments, such as a network or device that may be utilized to expose the computing device 100 to malware or other similar malicious applications. In some instances, the legacy memory 135 may include safe legacy applications 140.

While discussed in greater detail below, the trusted memory 115 may store a content insertion module 145, a firewall application 150, and a sensitive information module 155, as well as other modules that are executed by the trusted processor 110.

Generally, the computing device 100 includes separate components (hardware and software) that could impact the security, privacy, and/or safety of the user. All computing aspects that could impact the security, privacy, and/or safety of the user are prevented from being executed within the legacy environment 125 are incorporated into or executed within the trusted environment 105. The user interfaces with the computing device 100 through this trusted environment 105, which allows the user to conduct computing operations safely and securely, while protecting the privacy of the user as well.

While only one legacy environment 125 is illustrated, it will be understood that the computing device 100 may comprise several legacy environments, supporting various levels of computing functions/operations. A legacy environment 125 is a computing unit which may share its CPU with other legacy environments. In other embodiments, each legacy environment may have a dedicated processor. One legacy environment may allow full and free use of network resources, such as Internet access, with downloads and execution of applications allowed. Another legacy environment might allow the use of only safe legacy applications 140, such as applications that come from trusted application providers or applications that are approved by the user. Another legacy environment might be dedicated for games or other specialized computing applications.

It will be understood that the hardware and software components of the trusted environment 105 may differ to accommodate various design requirements. By way of non-limiting example, in order to reduce cost a designer can use a lower cost CPU in the trusted environment 105 and as result some computing intensive functions as video chat that requires video and voice processing, compression/expansion, and encryption/decryption, may not be supported. In these instances the trusted environment 105 can transfer captured video and voice to a legacy environment 125 to carry out the above functions, where the legacy environment 125 incorporates a more powerful CPU.

The trusted environment 105 is connected to all I/O devices 160 and incorporates any software or application that could impact the security or privacy of the user. In other embodiments, the trusted environment 105 may be connected to a portion of the I/O devices 160 using trusted I/O interfaces 160A. The devices connected to the trusted environment 105 may include, for example, devices that receive, display, or otherwise process sensitive information. Similarly, the legacy environment 125 may be connected to a portion of the I/O devices 160 using legacy I/O interfaces 160B. The devices connected to the legacy environment 125 may include, for example, devices that receive, display, or otherwise process non-secure or non-sensitive information. Again, the legacy environment 125 includes a legacy second processor 130, an operating system (OS) 165, and safe legacy applications 140. The safe legacy applications 140 may include not only applications such as web browsers, word processing, email, and other similar applications, as well as one or more additional OSs and/or virtual machines. In general, the legacy environment 125 is similar to a conventional computing system architecture, such as the computing system 1 of FIG. 6.

In one embodiment, the trusted memory 115 and the legacy memory 135 may reside in a single memory device that has been separated into trusted and legacy portions. In other embodiments, the device may include only a single trusted memory that can be utilized by both the trusted processor and the legacy processor.

In some embodiments, the trusted environment 105 and legacy environment 125 may cooperate through gated channels 170 that allow the trusted environment 105 (and specifically an OS 175 of the trusted environment 105) control what data is transferred to and from the legacy environment 125. Specifically, the data transferred between the trusted and legacy environments are preferably controlled by the user, through one or more CPU/OS driver components 180.

In operation, a user interfaces with the computing device 100 via input and output devices, such as I/O devices 160. Various computing modules can be connected directly to the computing device 100 such as a GPS (Global Positioning System) module.

Input devices are devices that are receiving information from the user. This information may impact their privacy or security. For example, a keyboard provides input that is indicative of critical/sensitive information, such as user identifiers, passwords, account numbers, proprietary information, emails, and so forth. Such information may be stored within the trusted environment and made inaccessible to the legacy environment. Other exemplary input devices include, but are not limited to a mouse, a trackpad, motion-based input systems, a tablet, a touchscreen, a camera, a microphone, biometric devices (e.g., iris, finger print, voice recognition, face recognition, etc.), a scanners, a GPS device, and a joystick—just to name a few.

Output devices are presenting to the user information that might impact privacy or security. Exemplary output devices include, but are not limited to displays where sensitive content could be transferred to a remote operator (e.g., hacker). The output device could expose sensitive information to the hacker or allow the hacker to take immediate action. Exemplary actions could include the re-transmission of a human test (e.g., CAPTCHA) to create an email account.

Another vulnerable output device(s) may include speakers. For example, classified discussions may be captured and retransmitted to a hacker if executed in a legacy environment. Again, these output devices are also shielded from the legacy environment.

As mentioned, particular computing system or application designs might differ in the way data flows in the computing device 100, so the camera output, though protected, could be transferred as raw data directly to the legacy environment 125 for processing. Some designs might allow direct connection of the camera to the legacy environment 125. In some other designs a game joystick might be connected only to the legacy environment 125.

Trusted memory 115 is also separated from the legacy environment 125, allowing for control of what data is accessed by the legacy environment 125, whether the data is read or stored. The network interface 185 provides an interface with a network or other computing devices or hardware that is external to the computing device 100. Thus, all data transfers are controlled by the user through the trusted environment 105.

Sensitive information in the trusted environment 105 is protected from exposure to malware in the legacy environment 125. Information maintained and used by the trusted environment 105 may include, but is not limited to: firewall settings; directories; email lists; user IDs and passwords; account numbers; favorites; encryption codes; credit card numbers; and social security numbers, as well as other types of sensitive information that would be known to one of ordinary skill in the art with the present disclosure before them.

Figure 2:
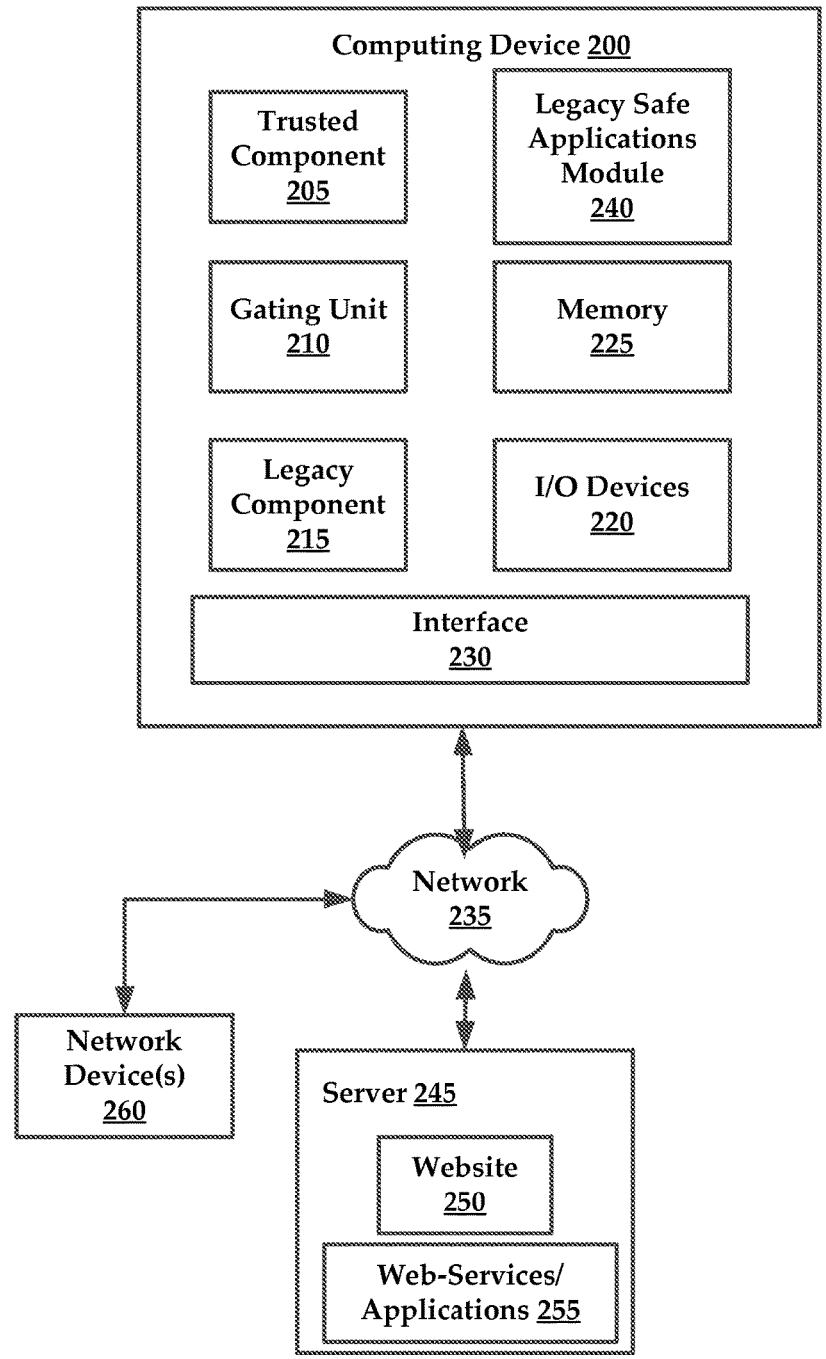
FIG. 2 is an exemplary network arrangement including a computing device, such as the computing device of FIG. 1, in communication with a server and one or more network devices.

FIG. 2 an exemplary additional embodiment of the present technology. The computing device 200 (also referenced as computing system 200 and system 200) includes a trusted component 205 having the components of a trusted environment 105 of FIG. 1, as described above, as well as a gating unit 210 to interface with a legacy component 215. The user operates the computing device 200 through the I/O devices 220. A memory 225 is used to store data and programs utilized by the trusted and legacy components. An interface 230 is used for accessing other computing systems, communications, and network 235. The interface 230 is controlled and monitored by the trusted component 205. Again, the interface may include a plurality of varying types of interfaces that are required for the system 200 to couple with the various external devices, systems, and networks, such as external device 260.

A legacy safe applications module 240 is used to execute safe applications that are considered as coming from trusted sources and may be relatively securely upgraded and updated even via the network 235. The legacy component 215 is used for all other operations such as Internet access, downloading data and programs, as well as executing and running those programs.

Protected communications are carried out by the trusted component 205. Such communications may include, but are not limited to, bank account management, accessing medical records, handling patents or business negotiations, and the like. The trusted component 205 may determine if a communication potentially includes protected communications, where these protected communications include or may expose sensitive information.

Software or application utilized by the system 200 can be modified to take advantage of the dual environment nature of the system 200. For example, the system 200 can support existing software by means of the legacy component 215.

According to some embodiments, the management and execution of an application may be divided between the trusted and legacy components. For example, applications can be designed such that there is a trusted module that executes in the trusted component and a legacy module that executes in the legacy component. Alternatively, programs can be written to only run on a trusted environment of a trusted component 205. These applications can leverage the secure communication that the trusted environment provides. In some embodiments, requests for acknowledgement (Ack) or authentication can be made through the trusted environment and may be displayed for the user directly to a display device, such as a monitor or a web browser client without the involvement of the legacy environments. This means that the display device may have a unique structure to support this capability, as described above.

The system 200 may communicate with a server 245 that facilitates a website 250 that provides web services. The computing system 200 communicates with the website 250 via the network 235. Web services or applications 255 that are executed on the website 250 may be modified to maximize security of the website 250. The system 200 can be utilized to facilitate the secure transfer of funds from account. By way of example, the website 250 includes a bank site that may be accessed from a legacy component 215 of the system 200. The request for fund transfer can be made directly to the website 250 from the trusted component 205. The website 250 transmits to the system 200 a request for a user ID and password can be displayed directly to the user, by the trusted component 205 without use of the legacy component 215. Remaining portions of communications between the system 200 and the website 250 can be made directly by means of the trusted component 205. Therefore, the legacy component 215 cannot access sensitive data such as account balance, account number, amount transferred, transaction addresses (e.g., routing or bank number), and so forth. Non-sensitive site information can be presented through the legacy component 215 such as promotional videos, general bank information, and the like, so the computing processes required of the trusted component 205 are reduced.

In some embodiments, the present technology may be configured to execute modules/functionalities of an application in the trusted environment and one or more legacy environments. For example, a computing program may include three or more separate modules that can be executed in sequence or in parallel with one another. A first module of the application may be executed in the trusted environment, while a second module (e.g., routine or process) can be executed in a legacy environment. Finally a third module can be executed in a second legacy environment. As with other embodiments, the trusted environment may execute a first module of the application that utilizes or implicates the use of sensitive information, while a legacy environment execute a second module of the application. Also, a third module is executed by a second legacy environment. It will be understood that both legacy environments process data that is not secure. Often the legacy environments will execute modules of the application that are computing resource intensive, where these modules do not process or utilize sensitive information.

Advantageously, the present technology may be used with all secured communication methodologies, where legacy components are prevented from accessing, in any way, sensitive information. In some cases, modifications to the server 245 or website 250 may be facilitated. In an alternate embodiment, acknowledgement requests might be displayed using the legacy component 215 but not the responses thereto.

In some embodiments all communication may be channeled through the trusted component 205. Thus, access to a network 235 via a central site may be forced, increasing the security of the system and providing an opportunity to integrate information related to multiple users, such as malware threats, site grading, risk analysis, hacker avoidance, detection, and tracking.

Figure 3:
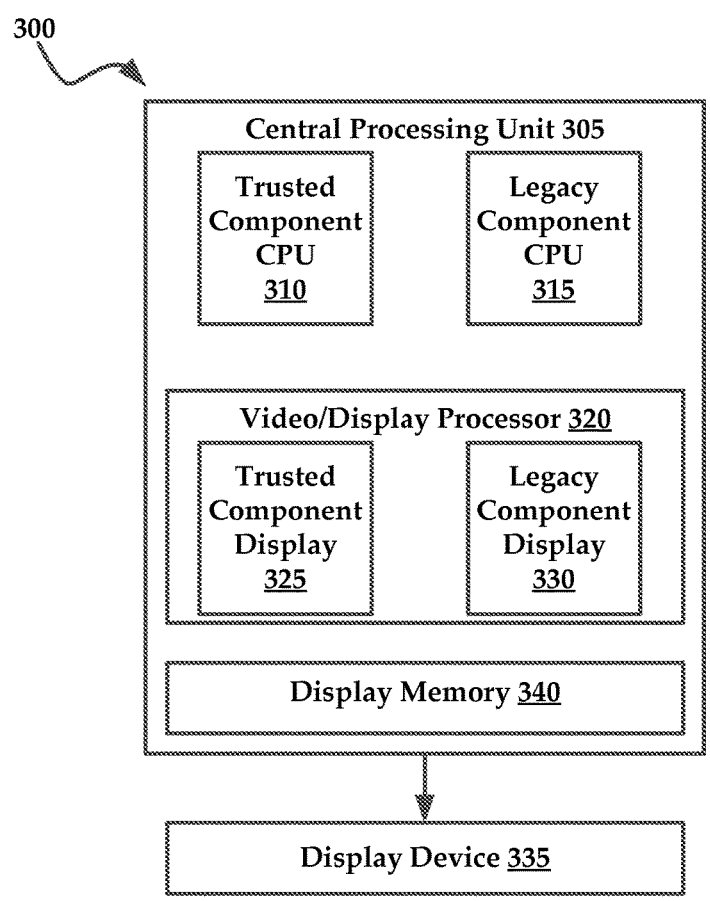
FIG. 3 is another exemplary implementation of a computing device, such as a CPU portion having both a trusted portion and a legacy CPU portion, the device being constructed in accordance with the present disclosure.

FIG. 3 is a schematic diagram of a device level implementation of the present technology on device 300. This implementation can reduce the cost of a system that integrates the device. The CPU 305 of the device 300 may contain the processing portions of both trusted 310 and legacy 315 components, both being constructed as described above. The communication between the trusted 310 and legacy 315 components allows full control of the trusted component 310 over the legacy component 315, by virtue of hardware design. For further shielding of user information from malware, sensitive information displayed or otherwise output to the user can occur directly, without allowing access of the legacy component 315 of the CPU 305 to the displayed sensitive information.

A display processor 320 has a trusted 325 and a legacy 330 components, which are connected directly to a display device 335 by means of a display memory 340.

As mentioned above, handling of malware within the legacy environment by the trusted environment is possible. The architecture inherently provides the following protection features: (a) system memory is protected from malware access; (b) user actions and data entered are shielded from the malware; (c) malware may not modify the firewall; (d) malware cannot access the email lists; and (e) malware is prevented from accessing the network, such as the Internet. In some embodiments, encryption techniques may be executed entirely within the trusted environment.

Additional features may be added such as comparing malware actions to user inputs, which allow for the detection malware in the legacy environment. For example, a system of the present technology may simulate keyboard actions executed by malware while the user is not keying or input different keys. Such knowledge may indicate malware presence. A system of the present technology may also monitor attempts to access certain memory areas by a legacy environment. These attempts to access memory could indicate malware presence. Attempts to access the Internet or another network with certain content or at certain locations (e.g., URLs) could indicate malware presence. For example, the system may detect an attempt to transfer a human test (e.g., CAPTCHA) to a remote site.

In some embodiments transfers of pseudo-information by an exemplary system can be allowed as part of means to defeat malware actions and identify activity of that malware on a network. Monitoring programs running on a legacy system allows a trusted environment to mark specific malware programs. Handling of malware by a central site can further enhance the protections of users. For example, communication with individual end user computing devices may include obtaining URLs (both accessed and attempted) of the end user system, and correlating specific information that was in the end user system with pseudo-information used by malware such as account numbers, passwords, URLs, IP, medical data, and credit cards.

The present technology may also facilitate the exposure of malware and provide potential remediation opportunities. For example, if a malware application in a legacy environment attempts to download data from "infected" systems, these malware applications can be seeded with data that can be marked, allowing for identification of the malware. Also, the trusted environment can seed infected data that is transmitted to the malware to infect and attack the malware control system.

The following include some non-limiting implementations for the present technology. For example, smart sensors may be designed with the split trusted/legacy component architectures provided herein. To allow remote upgrades and networking of the smart sensors, the trusted environment of the smart sensor can provide certain raw data to a central system that can be processed and compared to the data processed by the legacy environment of the smart sensor. The raw data provided by the trusted environment of the sensor can be transmitted to the central system at a lower rate transfer rate. The software design for the sensors can take into consideration typical malware exposures of a smart sensor and potential infections, potential risks, and the options for detecting an infection. These processes may be facilitated by lower rate processing of raw data received from the trusted environment.

Another example involves a router that is constructed in accordance with the present technology. The use of a trusted environment in a router allows for the detection of modifications in the router legacy environment, such router settings. Again, the detection is made by comparing trusted data to suspected malware contaminated data.

Figure 4:
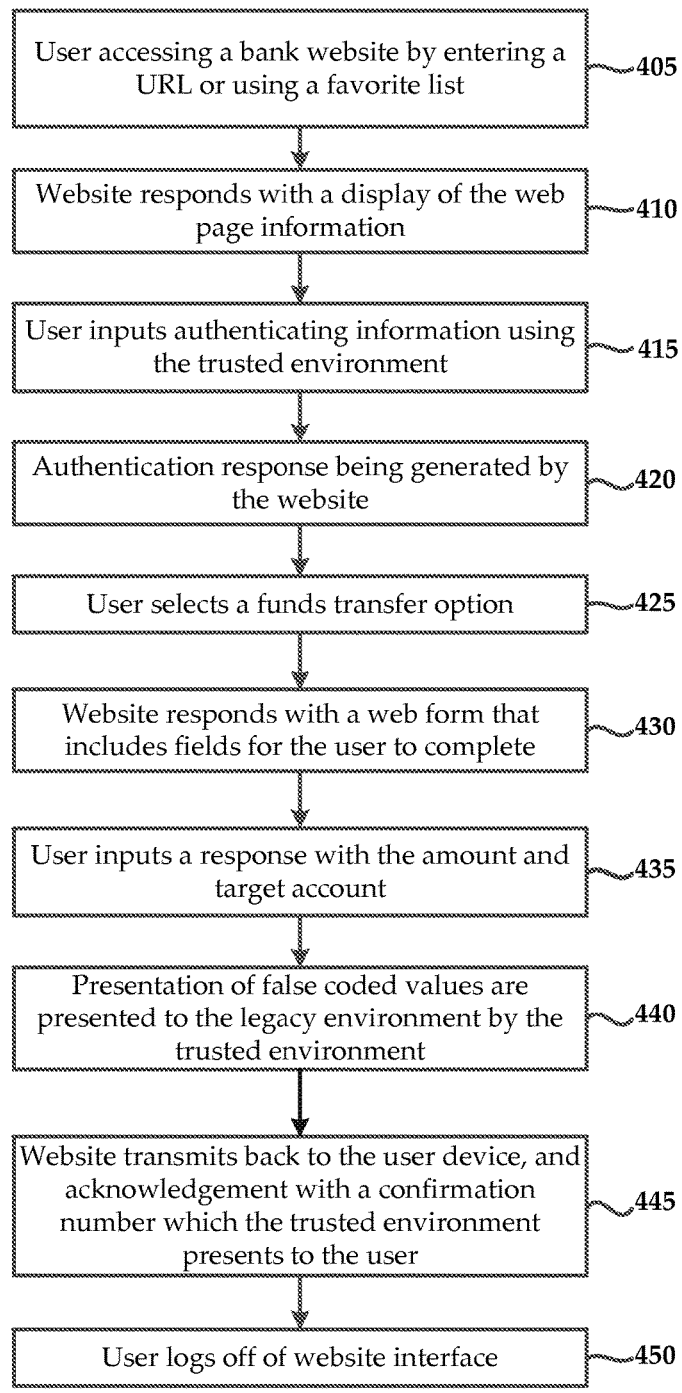
FIG. 4 is a flowchart of an exemplary process of conducting a financial transaction using the network arrangement of FIG. 3.

FIG. 4 is a flowchart of an exemplary use case including process of transferring of funds between accounts. The flowchart describes separation of operations between trusted and legacy environments to achieve privacy protection goals while allowing the legacy environment to handle the heavy (e.g., computing intensive) processes and trusted environment to protect the security, privacy, and safety of the user.

The process starts with the user accessing 405 a bank website by entering a URL or using a favorite list (which resides in the trusted environment). Again, this information is blocked by the trusted environment from the legacy environment. A firewall that resides in the trusted environment allows the user device to access the URL on the network, via the network interface that is dedicated to the trusted environment. It will be understood that the firewall is fully monitored by the trusted environment and the legacy environment is prevented from access the firewall. The website responds 410 with a display of the web page information with the feature rich capabilities via the trusted environment, bolstered by the powerful processor of the legacy environment. These pages include a login page where the user inputs their authentication information.

The user inputs 415 authenticating information using the trusted environment using, for example, a keyboard. It is noteworthy that the end user interacts with the computing system as with a typical computing system. That is, the computing system, while including both a trusted and legacy component, appears to function to the end user as a typical computing system. The dual operations of the trusted and legacy environments are conducted transparently to the end user.

Again, authentication information is not presented to the legacy environment as it includes sensitive information. In some embodiments, if the trusted environment determines that the login page is operated by malware or an untrusted system (such as with a phishing attempt), the trusted environment may present the user with an option to fight malware, which includes allowing the legacy environment to provide the phishing website with a false account number and password.

If malware may attempt to access the account without the user knowledge or consent, or transfer the information to a remote hacker (and potentially coded false information) can be used to identify the source and the time of such "breach" of security and the presence of malware in the computer.

The process also includes an authentication response 420 being generated by the website. Previously, the website received the user's authentication credentials from the IP address identified with the trusted environment and authenticated the user. The account balance is displayed to the user via the trusted environment.

Once authenticated, the user selects 425 a funds transfer option. The website responds 430 with a web form that includes fields for the user to complete such as amount and target account for funds transfer.

The user inputs a response 435 with the amount and target account. Optionally, false coded values may be presented to the legacy environment by the trusted environment in step 440. The website transmits back to the user device, and acknowledgement 445 with a confirmation number which the trusted environment presents to the user. Also, a coded value may be presented to the legacy environment, allowing tracing of malware activities and remote hacker involvement. The user may logout in step 450.

Again, portions of the website may be generated for display by both the trusted and legacy environment. These outputs are combined together in the legacy environment to create a cohesive display for the user. The website is programmed to operate effectively with the present technology, leveraging the advantages of the dual nature (trusted/legacy) of the user devices.

The website can cooperate with the user devices by false coding information provided by the user devices. This false coding allows the website to identify the sources of hacking attempts by matching the false information with IPs that communicate malware. Attempts that are made from the user system may be identified by the user system and allow for a transparent transfer of data to the website, where the legacy environment IP identifies the source. Since the information that is accumulated by the site is false (e.g., spoofed) and coded, attempts to use it by the malware or a remote hacker can expose such attempts and the source, such as the IP address or MAC address of the malware system.

Other exemplary implementations of the present technology will be described. For example, the present technology may be implemented as part of programmable sensors such as within a smart grid, nuclear reactors, home automation, fire alarm, sensors network, and so forth. Authentication can be effectuated by creating an additional source of data that is transmitted directly from the trusted environment to a central system and evaluated by comparison with complementary processed data received from the legacy environment. Contamination of the legacy environment can be indicated by discrepancies between the expected values from processing the direct channel information from the trusted environment and the output of the legacy environments of the remote sensor.

The present technology may be adopted to protect existing computing systems. For example, an external unit or trusted computing component may be added to an existing legacy computing device through which a network, such as the Internet, can be accessed. All or some of the input devices (or output devices), can be connected to this external unit. The external unit may be a physical box or a card in the computing device. At a minimum, the keyboard is connected to this external unit. Based on the specific implementation, the existing computing system might require driver changes.

This trusted computing component can encompass the components and behaviors of a trusted environment. In some embodiments, a trusted computing component can be added an external unit to which all or some of I/O devices are connected. In other instances a router may be used as a trusted environment to which I/O devices are connected. In some embodiments, the trusted environment may be incorporated into an I/O device such as a keyboard, which is configured to couple with other devices.

In some embodiments, the trusted computing component may include a card for a motherboard to which I/O devices are connected. Also, the trusted computing component may include a unit that is added between a keyboard and a PC, such as a USB interface, to which an Ethernet connection may be added. This trusted computing component may be added in parallel or serial with the PC.

Other exemplary uses for the present technology include human tests, such as CAPTCHA, which can be handled in a trusted environment.

The present technology supports the use of BYOD (Bring Your Own Device) technologies since the present technology reduces greatly the ability of an end user to contaminate a network. Also, mobile payment systems can be improved by use of the present technology enabling the exchange of transaction codes between the financial institution and the trusted environment of the "mobile" computing system (e.g., smartphone, pad, notebook, PC, etc.), rather than the use of credit cards. In some embodiments, transactions are made by use of these codes only, where each user has a number of codes. The codes expire when used and/or according to a set time frame. The codes are updated by direct communication between a trusted environment of a computing system and the financial institution.

The secured communication provided by the present technology allows for greater flexibility and feature rich applications that may be downloaded from the Internet or communicated between participants in the game. Current multiuser games are very vulnerable to disastrous contamination of computing systems by malware. The use of trusted environment for sensitive information and legacy game oriented environments enables secure communication and downloads of information between users, store sites, and service sites. By way of non-limiting example, the present technology may allow for use of secured GPS services (connected and transferred through the trusted environment) which allow transfer of data on conditions of anonymity and perimeter protection. This protected GPS data may not be hacked and as result a user perimeter control may be implemented to avoid undesirable user address exposure. The database for game participants may be comprised of game codes that are a means of communication between a trusted environment and the game site, where all user information is maintained in the trusted environment of the user computing device and not on the game server side.

The present technology may also provide users with secure access to social networks. For example, the present technology may be utilized to effectuate a secure upload of information into user pages can provide a safe authentication features. Communicating may also be facilitated through a trusted environment. The user could separate the information they are willing to share into portions that can be carried on a separate portable removable storage. This private information may be integrated with a cloud presence in a seamless nature while maintaining an increased level of privacy and safety.

Figure 5:
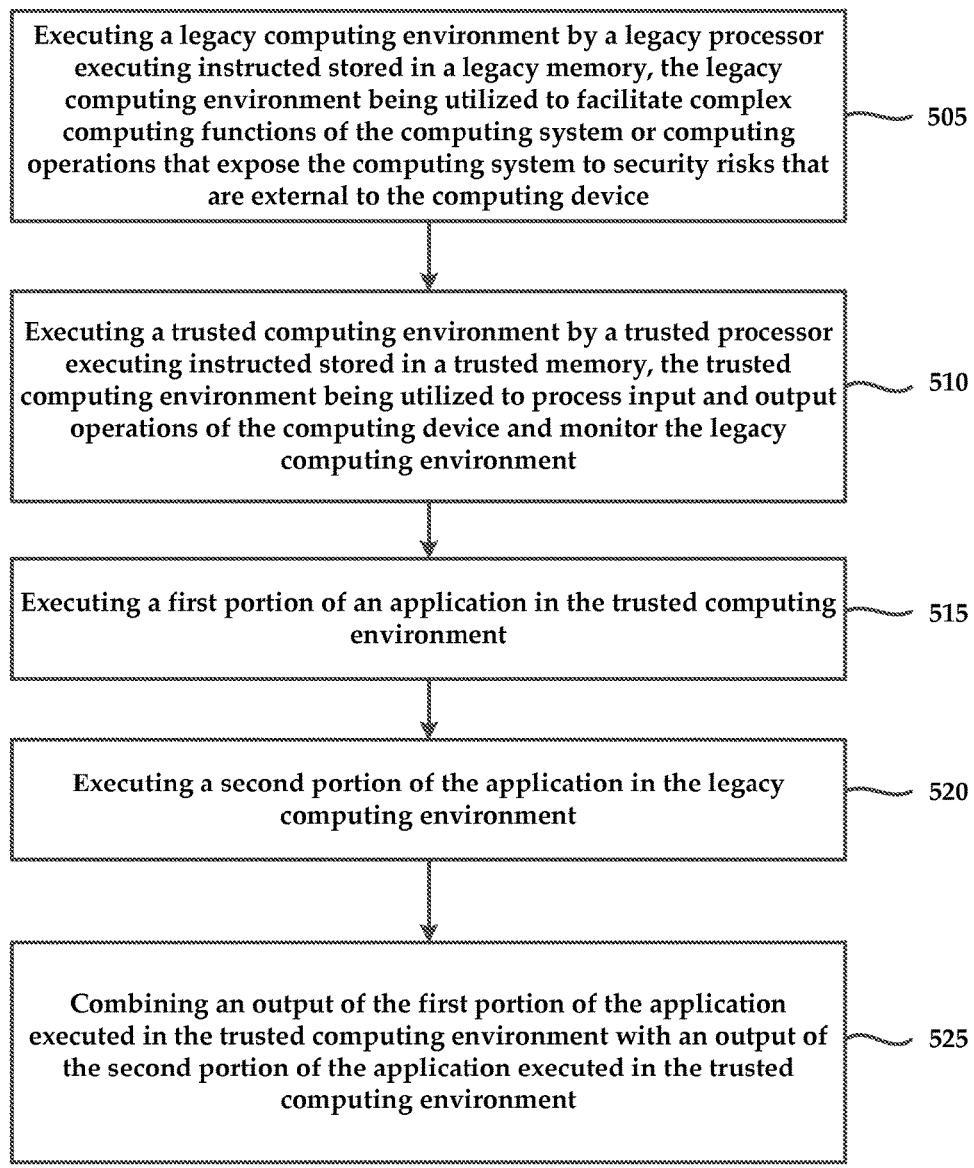
FIG. 5 is a flowchart of an exemplary method for providing secure computing operations on a computing device, the computing device being constructed in accordance with the present disclosure.

FIG. 5 is a flowchart of a method for providing secure computing operations on a computing device. As mentioned above, the computing device includes the dual trusted and legacy architecture described above. In some embodiments, the method includes executing 505 a legacy computing environment by a legacy processor executing instructions stored in a legacy memory. It is noteworthy that the legacy computing environment is utilized to facilitate complex computing functions of the computing system or computing operations that expose the computing system to security risks that are external to the computing device.

In some instances the method includes executing 510 a trusted computing environment by a trusted processor executing instructions stored in a trusted memory. As mentioned above, the trusted computing environment is utilized to process input and output operations of the computing device and monitor the legacy computing environment.

In some embodiments, the method includes executing 515 a first portion of an application in the trusted computing environment; and executing 520 a second portion of the application in the legacy computing environment.

According to some embodiments, the method includes combining 525 an output of the first portion of the application executed in the trusted computing environment with an output of the second portion of the application executed in the trusted computing environment.

Figure 6:
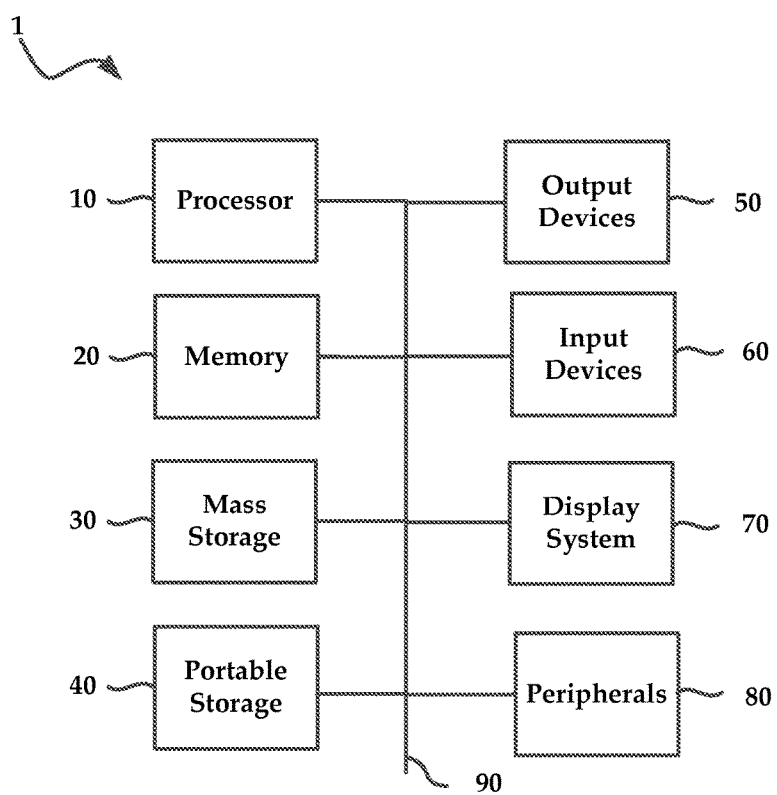
FIG. 6 illustrates an exemplary legacy computing system that may be used in conjunction with a trusted computing environment of the present technology.

FIG. 6 illustrates an exemplary computing device 1 (also referenced as computing system 1) that may be used to implement an embodiment of the present systems and methods. The computing system 1 of FIG. 6 may be implemented in the contexts of the likes of computing devices, radios, terminals, networks, servers, or combinations thereof. The computing device 1 of FIG. 6 includes a processor 10 and main memory 20. Main memory 20 stores, in part, instructions and data for execution by processor 10. Main memory 20 may store the executable code when in operation. The computing system 1 of FIG. 6 further includes a mass storage device 30, portable storage device 40, output devices 50, user input devices 60, a display system 70, and peripherals 80.

The components shown in FIG. 6 are depicted as being connected via a single bus 90. The components may be connected through one or more data transport means. Processor 10 and main memory 20 may be connected via a local microprocessor bus, and the mass storage device 30, peripherals 80, portable storage device 40, and display system 70 may be connected via one or more input/output (I/O) buses.

Mass storage device 30, which may be implemented with a magnetic disk drive or an optical disk drive, is a non-volatile storage device for storing data and instructions for use by processor 10. Mass storage device 30 can store the system software for implementing embodiments of the present technology for purposes of loading that software into main memory 20.

Portable storage device 40 operates in conjunction with a portable non-volatile storage medium, such as a floppy disk, compact disk or digital video disc, to input and output data and code to and from the computing system 1 of FIG. 6. The system software for implementing embodiments of the present technology may be stored on such a portable medium and input to the computing system 1 via the portable storage device 40.

Input devices 60 provide a portion of a user interface. Input devices 60 may include an alphanumeric keypad, such as a keyboard, for inputting alphanumeric and other information, or a pointing device, such as a mouse, a trackball, stylus, or cursor direction keys. Additionally, the computing system 1 as shown in FIG. 6 includes output devices 50. Suitable output devices include speakers, printers, network interfaces, and monitors.

Display system 70 may include a liquid crystal display (LCD) or other suitable display device. Display system 70 receives textual and graphical information, and processes the information for output to the display device.

Peripherals 80 may include any type of computer support device to add additional functionality to the computing system. Peripherals 80 may include a modem or a router.

The components contained in the computing system 1 of FIG. 6 are those typically found in computing systems that may be suitable for use with embodiments of the present technology and are intended to represent a broad category of such computer components that are well known in the art. Thus, the computing system 1 can be a personal computer, hand held computing system, telephone, mobile computing system, workstation, server, minicomputer, mainframe computer, or any other computing system. The computer can also include different bus configurations, networked platforms, multi-processor platforms, etc. Various operating systems can be used including UNIX, Linux, Windows, Macintosh OS, Palm OS, and other suitable operating systems.

Embodiments described below relate to security challenges posed by mobile devices that are connected to networks, such as corporate networks, a trend termed B.Y.O.D. (Bring Your Own Device).

Some of these embodiments provide systems/devices and methods that prevent mobile devices, such as may be found in corporate networks, from damaging the corporate network and its members through the use of malicious attacks.

The present technology protects the network from the mobile devices and any attacks that the mobile devices may attempt to launch against the network. The present technology includes protection by software installed on the mobile device or by adding hardware to existing parts of the network (including the mobile devices). Example hardware comprise an external unit to the computing system, such as a dongle, a card that is added to a computing system by plugging into a socket or other interface of the computing system, or by firmware added to a circuit of the computing system.

The trend that allows users to use their own Smartphones or PADs to integrate into corporate networks presents a challenge to securing these networks. The challenge results from the potential contamination of such devices by malicious software (malware) that is designed to access and get hold of corporate secrets. Since such devices are at the disposal of the user for personal communication, the probability is higher that such contamination may occur. Still there is the desire to allow the user to communicate with the corporate network with such devices, since it is convenient and may improve users' productivity. Additionally, corporations can benefit from not having to purchase end user devices for their employees.

The systems, devices, and methods of the present technology are an enhancement to secure communications of such devices with the network. The goal of the present technology is to protect the network from the users' devices and possible malware or malicious attacks.

Authentication of users and prevention of malware from mobile devices accessing and operating in the networked environment can create complications from a security perspective. Advantageously, the present technology achieves solves these issues by authenticating requests posed to the network, by employing a central "clearing" means on the network through which the mobile devices are accessing the network. These clearing means are referred to as trusted environment devices (also referred to as a module, system, card, and the like).

It can be assumed that malware programs attempt to communicate with the network in order to obtain access to network resources or nodes, or to take action that is contrary to (or in excess of) the permission level assigned to the user or the means of communication.

In some embodiments, authentication can be accomplished by using software to specifically program a computing system that is attempting to access the network. For example, human tests that use image, video, text, verbal message, CAPTCHA can be used, as well as biometric input such as camera, finger print, voice recognition, and iris scan—just to name a few.

These authentication types can be implemented by communicating over the corporate network or over an alternative network such as a cellular network, or through a Wi-Fi access point.

These techniques are vulnerable to being contaminated by malware, presenting three example risks: (1) masquerading as authenticated user/process; (2) defeating authentication; and (3) participating in network DDoS (distributed denial of service), as well as other techniques that would be known to one of ordinary skill in the art By adding external trusted environment devices of the present technology that can be implemented on various levels of integration into the mobile device or/and its peripherals, the protection of the network may be enhanced since the authentication is improved greatly, even in presence of malware.

Some embodiments contemplate authentication by an external unit (such as a dongle). The dongle will serve as the communication means of the mobile device to the "clearing" center of the network. In some embodiments, the clearing center could include the corporate server that is provided also with a trusted environment device or module.

The dongle will serve as a trusted environment device for the mobile device. The dongle will include an authentication module that uses at least user action (such as a button) that is shielded from the mobile device and could not be imitated or emulated by the mobile device.

The dongle may include more than one key or button, a display, one or more colored LEDs, a microphone, a speaker, a camera, and so forth. The user can communicate directly with the network in such a way that the network is totally shielded from the potentially contaminated mobile device. Such trusted environment devices may be added also to notebooks or even desktop PCs or servers on the network. Various examples will be provided below in greater detail.

Networked additions to smartphones may be integrated by means of appliances, modified IT administrator station, and servers. Software written for such networks will implement monitoring software that will detect anomalies or unauthorized requests before damage is caused. Such monitoring will allow for protection of the corporate network but users will benefit as well since malware will be detected early in its deployment and will not be able to operate without user consent.

In some embodiments, the implementation will use the voice channel of the mobile device to communicate to the user and/or SMS, creating multiple factor authentication functions. Some processes that can benefit from this approach include, but are not limited to modifying a password, altering a firewall list, gaining access to secured information, and so forth.

Employing such techniques may also defeat insiders by combining biometric and presorted references and actual videos or voice messaging. Having the security department of the corporation providing these features to users will allow for providing even better security, for example, the creation of presorted image and/or video files or voice signatures stored in the dongle.

In another embodiment, an external card for a computing system can function as a trusted environment device. This external card is installed in a socket connected to the motherboard. In some embodiments, at least the keyboard and network (Internet) access functions of the computing system are carried by the external card that serves as the trusted environment.

As more I/O devices are connected to the external card the secured operations are improved such as, display, camera, microphones, speakers, biometric devices, and others. Software to protect data and applications of the computing system are also protected such as passwords, encryption code and application, firewall, and so forth.

The external card communicates to the legacy parts of the computing system by means of existing I/O interfaces, with no need of modifications to APIs in the legacy portions. By way of example, a legacy USB port that is used for keyboard input may be used with the card to transfer keyboard strokes to the legacy system.

In another example APIs servicing these I/O devices can be modified in the legacy environment to use a card interface such as the PCI or PCIe for communicating keyboard strokes.

In other embodiments, the trusted environment device/module can comprise firmware/microprocessor-system, which is added to a legacy-computing component for enhanced security. All I/O will be preferably controlled by the additional hardware (e.g., the trusted environment device) and particularly the network connections and the keyboard connection.

Another extreme case may be the use of two computers, one serving as a trusted environment, taking care of all I/O functions, and the other as a legacy system. This is clearly overkill, but in some cases a designer might prefer this structure.

Peripherals may be modified to create trusted environment operating with the legacy environment, to enhance and secure the whole system to which the peripheral is connected. Example of such peripherals may be keyboards or home routers.

Software supports these trusted environment devices and allows for secured applications to run. The legacy environment runs seamlessly on the legacy component (e.g., off the shelf computing system or legacy components of that system) while the trusted environment device monitors the legacy operations.

In sum, the present technology adds components (e.g., trusted environment devices) and programs that enhance security of computing systems, such as, PCs, PADs, smartphones, servers and so forth.

The additions allow for the detection of unwanted software (malware) that accidently or on purpose, was installed in the legacy system. The add-on is a trusted environment device or module that cannot be infected by downloaded software. It allows for safe authentication of user actions and allow for the implementation of effective network protection processes.

In some embodiments, the present technology includes hardware (in some instances firmware) and software. A device is formed that serves as a trusted environment, which is added to a legacy system/environment. The device allows for user authentication by the trusted environment that is configured to provide such features through instruction stored in memory and executed by a processor. In some cases the interface to the legacy system/environment is modified to allow the trusted environment to fulfill its tasks.

The added trusted environment may be implemented to provide protection to user critical data (such as passwords, encryption codes, email lists . . . ) or applications (such as firewall, encryption, email, SMS . . . ). The functionality of the trusted environment depends on the integration level with the legacy system/environment.

In some embodiments, a module of the present technology can be added externally to the legacy system (such as a dongle for a smartphone). This module can be limited with one or more security functionalities when compared other embodiments such as an add-on card to a computing system, since the integration with the computing system is more involved than with the external dongle for the smartphone.

Figure 7:
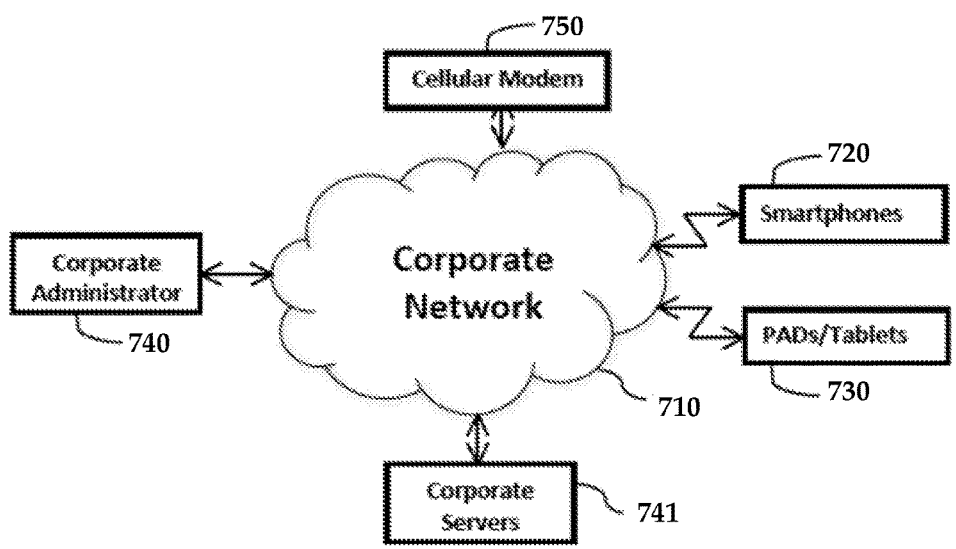
FIG. 7 is a schematic diagram of a prior art BYOD (Bring Your Own Device) system.
Figure 8:
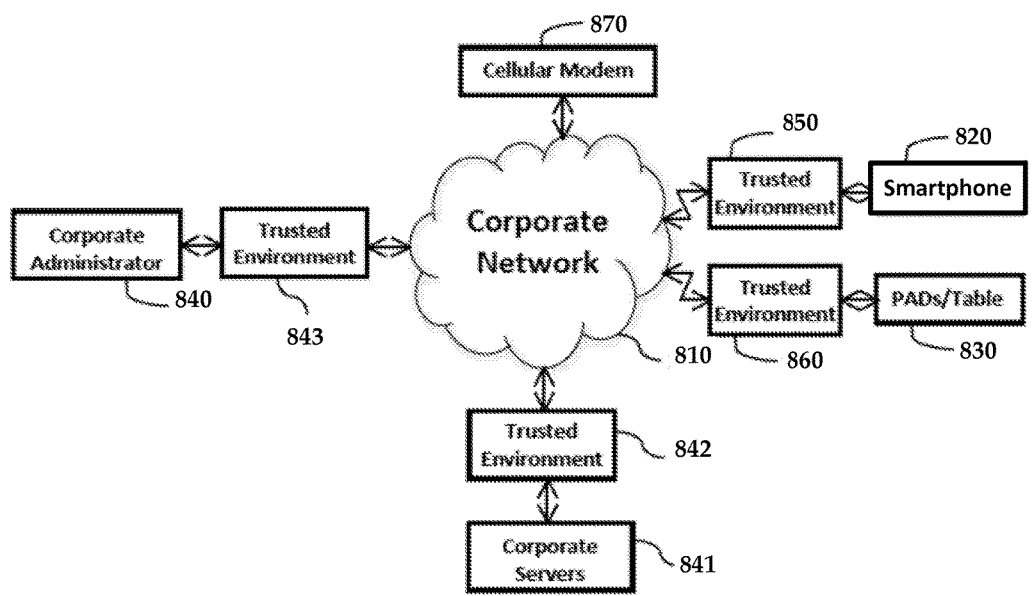
FIG. 8 is a schematic diagram of a BYOD system of the present technology that utilizes trusted environment devices/modules.

For purposes of context in describing the embodiment of FIG. 8, a prior art network is illustrated in FIG. 7. More specifically, FIG. 7 depicts the basic configuration of the BYOD (Bring Your own Device) network, created when users' devices, such as smartphones, PADs, and even notebooks are used and connect to the corporate network. In general, devices that are not limited to corporate only use are potential sources of contamination.

The corporate network 710 provides communications between the corporate computing systems and serves as an interface to the external world or other networks, such as the Internet, cellular telecommunications systems, and so forth.

The corporate components will include at least the corporate administrator 740 systems(s) and the corporate server(s) 741. Other corporate systems may be connected to the corporate network 710. All of these systems are similar in structure to the corporate administrator 740 or corporate server 741.

The interface to external world and other networks is represented by the cellular modem 750. Note that all communications described hereinafter with regard to the cellular interface are applicable to other networks to which the corporate network is connected.

The smartphone 720 and the Pads/Tablet 730 represent BYOD user devices that pose a greater risk to the corporate network 710 by introducing malware or conducting a malicious attack.

The following are various software related methods that provide solutions to secure the system. Some methods are based on multifactor authentication where authentication features are included as add-on applications that will run on the BYOD user devices, 720 and 730, and will be monitored and controlled by the corporate administrator 740. In another example the authentication of users and requests may be used to defeat malware attempts. Examples include a human test where messages (e.g., CAPTCHA, images, video, etc.) of various types may be exchanged to authenticate the user. In another example, messages are sent by the corporate server 741 or the corporate administrator 740 to the BYOD user devices 720 and/or 730. Example messages include SMS directly over the corporate network 710 or via the cellular modem 750 (that may represent also other connections such as the Internet), voice messages via the cellular system or the Internet connection, images or video messages, or any other means—even CAPTCHA. In yet another example, the BYOD user will respond appropriately via the communication means as designed for the system.

In an additional example, biometric devices and processes may be used to authenticate the user, such as voice recognition, finger print, or facial recognition. The user data is processed and authenticated by the corporate server.

Turning now from the prior art to embodiments of the present technology, FIG. 8 illustrates a solution that enhances the security of the BYOD corporate network by adding a trusted environment device to a BYOD user device. The basic diagram of the corporate communication architecture is modified by incorporating trusted environment devices with each (or at least a portion) of the various components that communicate over the corporate network 810.

The security of a component of the corporate network 810 is enhanced even only one BYOD user device within the corporate network 810 that has been modified to include a trusted environment device. In some embodiments, all components of the corporate network implement a trusted environment device.

Figure 9:
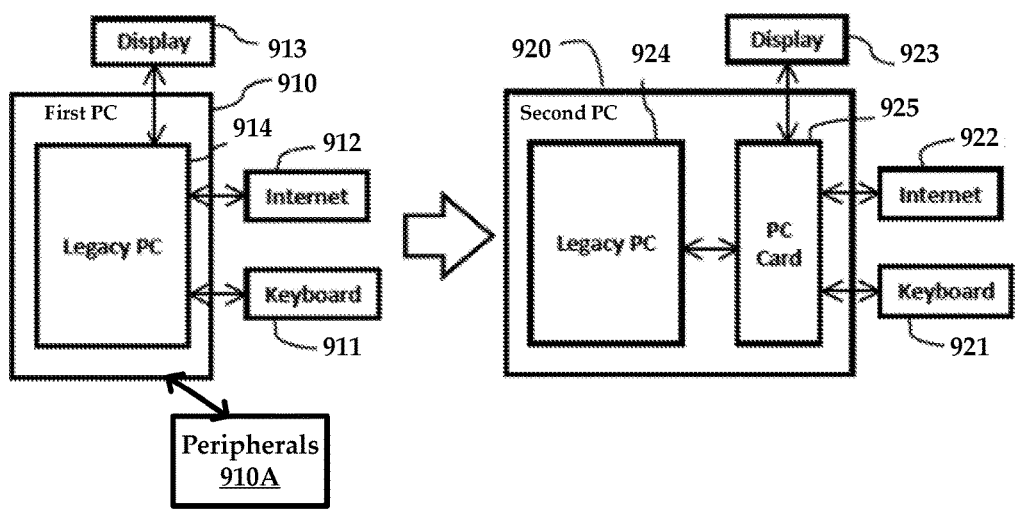
FIG. 9 is a schematic diagram of a computer system that has been modified with a trusted environment device in the form of a PCI add-on card.

The corporate network components such as corporate administrator 840 and corporate server 841 are integrated with trusted environment devices 843 and 842 respectively. These trusted environment devices may be designed into the corporate network components or add-on cards may be installed onto the corporate network components, as illustrated in FIG. 9. Thus, a corporate network component is defined as any computing device that facilitates or provides the corporate network 810, as opposed to the user devices that utilize the corporate network. The components of the corporate network and the BYOD user devices may alternatively be referred to as network nodes.

External trusted environment devices, such as dongles described for use with the BYOD user devices (e.g., Smartphone, tablet, PDA, laptop computer, etc.), might not provide the level of security that is suggested for corporate components. Although in some embodiments, the corporate network components can use an external device.

Trusted environment devices 850 and 860 are added to the BYOD user devices such as Smartphone(s) 820 and PDAs/Tablet(s) 830, respectively. For the purpose of the discussion it is assumed that the trusted Smartphones, PDAs, and Tablets are not integrated with a trusted environment device. Further, it is assumed that the each of the BYOD user devices incorporates an external trusted environment device such as a dongle or peripheral device that includes an embedded or connected trusted environment device.

In some embodiments, the external unit allows for safe user authentication. One or more of the security functions described with respect to FIG. 7 may be utilized. The security functionality provided by the external trusted environment device to the BYOD user device further enhances the security features of the BYOD user device.

The trusted environment devices 850 and 860 each enable communication of the BYOD user devices such as Smartphone(s) 820 and PDAs/Tablet(s) 830 across the corporate network 810 allowing for such functions as monitoring and blocking the BYOD communications through the corporate network 810 to the corporate units 840 and 841. The trusted environment devices 850 and 860 also enable safe and effective user authentication methods. These authentication methods can vary with the level of security that is desired and any functionality/output requirements for the BYOD user devices such as LEDs, simple digital display, speaker, simple or complex keys, and biometric devices such as finger print readers, a microphone, and/or a camera—just to name a few.

LEDs may be used to alert the user to communications attempts by the corporate server/cloud to the BYOD user device and provide warning and alerts of malware infection without malware detection.

By incorporating a trusted environment device to facilitate communication between the BYOD user devices and the corporate network, malware on the BYOD user devices may be blocked from executing DDoS attacks on the corporate network. The infection of other systems connected to the corporate network by an automated process of the malware can also be avoided. In some embodiments, the corporate units 840 and 841 are programmed to allow for user authentication by utilizing a challenge-response sequence that may not be imitated by malware. The malware does not have access to the resources of the trusted environment devices. Moreover, the user has to physically respond to a challenge. This combination of software-type authentication and resource sequestering in the trusted environment devices is advantageous in preventing malware infection on the corporate network.

The trusted environment devices 850 and 860 are provided to the user by the corporate entity (e.g., security department). The user can then install or attach a trusted environment device to their BYOD user device. In some embodiments, the BYOD device is used when the user is attempting to access the corporate network and the trusted environment device can be removed when the BYOD user device is being used to access public networks.

According to some embodiments, the trusted environment devices 850 and 860 will communicate with both the corporate network 810 and their respective BYOD user devices.

In some embodiments, each corporation might have a unique identification number and a database in the corporate server 841 that can be utilized to record and match BYOD user device information, corporate identifiers, and users together in the authentication process.

Turning now to FIG. 9, which depicts a process where a desktop computer may be modified with a trusted environment device such as an add-on card. A first PC 910 is provided and modified to create a second PC 920 by the installation of a trusted environment device in the form of a PC card.

The first desktop PC 910 represents a typical legacy system (e.g., off the shelf device) that includes a legacy PC (e.g., CPU or processor) 914, display 913, keyboard 911, and Internet (e.g., network) interface 912. The first desktop PC 910 may include additional peripherals 910A such as a mouse, a biometric device, camera, microphone, speaker, and the like, all connected to the legacy PC 914. Examples of other I/O devices and peripherals are described also with reference to FIG. 6.

A second desktop PC 920 is provided with a PC card 925 (trusted environment device), by adding the PC card 925 the First PC 910 is made a trusted system, that is connected to peripherals that are require securing. FIG. 9 illustrates an example connection to the peripherals such as a keyboard 921, display 923, and the Internet interface 922.

The legacy PC 924 is a legacy environment that carries out all the typical functions of a computing system. The PC card 925 serves as the trusted environment. To protect data or applications the legacy PC 924 and the PC card 925 are configured to allow for the protection of data or applications of the legacy PC 924.

The PC card 925 contains or controls access to storage that maintains such lists as passwords, encryption codes, contact lists, firewall white/black lists, signatures, and biometric signatures—just to name a few.

The PC card 925 can contain those portions of applications that are required to secure those applications. Following are some examples how some applications are secured so as to clarify the use of the PC card 925 in the legacy PC 914.

Interfaces from PC card 925 to legacy PC 924 may use existing I/O, emulating peripherals in the trusted environment of the PC card 925 so that API modifications are avoided in the legacy environment of the legacy PC 924 or via a card socket, such as PCI or PCIe. The API can be modified in the legacy PC 924 to allow peripherals to interface to the legacy environment of the legacy PC 924 via the trusted PC Card 925. For example, the interface from the keyboard 921 to the legacy PC 924, through the PC card 925 may be made via a USB standard interface and the keyboard emulation will be carried out in the PC card 925. In another example, the interface of the keyboard 921 is carried through the PC card 925 socket, such PCI, and an API for the legacy PC 924 modifies the communication to the keyboard.

In another example, a first computing system is utilized to connect to the I/O peripherals and serves as a trusted environment device, and a second computing system, connected to the trusted computing system (hereinafter "trusted PC"). This configuration allows a legacy environment to operate securely. The trusted PC monitors and control access to the legacy environment (e.g., second computing system) from the I/O peripherals including network communications.

With respect to encryption, a file to be encrypted is displayed directly by the PC card 925 on the display 923, where the Legacy PC 924 video is overlaid by the PC Card 925 video. Keyboard 921 strokes are displayed directly on the display 923 and information from/to the Internet 922 will also be displayed directly on the display 923. The encryption is made in trusted environment or the cloud.

Firewall security features can also be implemented. For example, lists are maintained in the trusted environment PC card 925. The list can be modified in the PC card 925 and all defenses implemented there. This may be also shared with the cloud.

Authentication security features can also be implemented. For example passwords, biometric, ID cards, and so forth. Programs are executed in the trusted environment PC card 925, when the input to the authentication program is kept in the trusted environment PC card 925, and protected from access by malware that may be present in the legacy environment, illustrated as the legacy PC 924. In some embodiments, the authentication features need to be connected to the trusted environment PC card 925.

Location features can also be implemented. For example, GPS or other location information could be protected in the trusted environment PC card 925 and the location information may be displayed by the PC card 925 directly on the display 923 while the map information is provided by the legacy PC 924.

Office and email programs and content are protected by separating the forms and templates that are used (non-sensitive data) from user inserted data (sensitive data). This is accomplished by sharing placement locations on the display, so two separated sources (or more) may be used for creating a single display 923. For example, the trusted environment PC card 925 providing sensitive information and the legacy PC 924 providing non-sensitive information.

In some embodiments, a computing system that does not provide connection of the display 923 to the trusted environment PC card 925, but still provides security with respect to passwords, encryption codes, firewall URL lists, email contacts, and the like (such as other types of data that would be advantageous to a malware attacker or program), due to the connection to the keyboard 921 and Internet 922. The trusted environment PC card 925 may lack some capabilities to secure data created by the user.

In another example, the PC card 925 may be an external unit (such as USB stick) that provides the same functionality as the embedded PC card 925 in the desktop PC 920, when the external unit is connected to the peripherals that need protection.

In another embodiment, setting of peripherals is made from the trusted environment (such as the PC card 925), preventing malware from controlling the peripherals. This is a general feature that can be applied to all implementations of the architecture.

Another feature that is general and widely applicable to the embodiments described herein is the possibility to create a single displayed screen by integrating information from different websites and channels/IPs, sourced in one or more sites. This integrated information is placed on the display 923 by various environments (trusted—PC card 925—and legacy—legacy PC 924).

Figure 10:
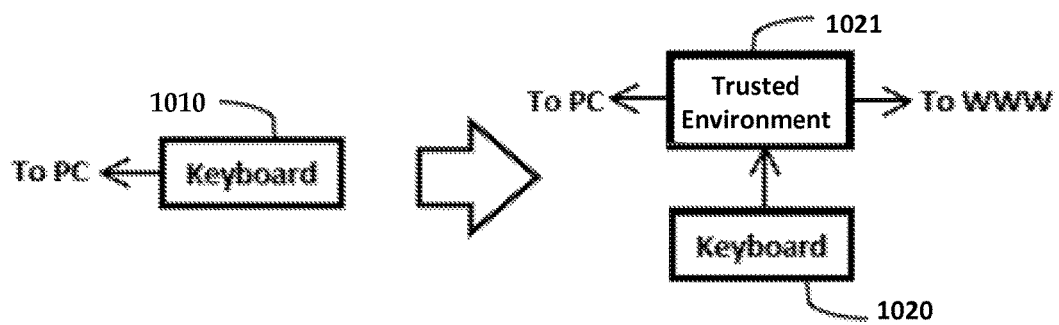
FIG. 10 is a schematic diagram of an example peripheral device, such as a keyboard, that has been modified by the addition of a trusted computing device therein.

FIG. 10 is an example of the modification of a keyboard peripheral that has been modified with a trusted environment device of the present technology. The keyboard 1010 is modified by embedding a trusted environment device 1021 therein. This trusted environment device 1021 is inserted between the PC (the legacy environment) and access to the keyboard 1020 and the Internet (or other network). In such implementations a manufacture of the modified keyboard may provide additional communication interfaces for other peripherals (as explained and illustrated with respect to FIG. 9) such as, displays, cameras, microphones, speakers, biometrics, and GPS—just to name a few.

Figure 11:
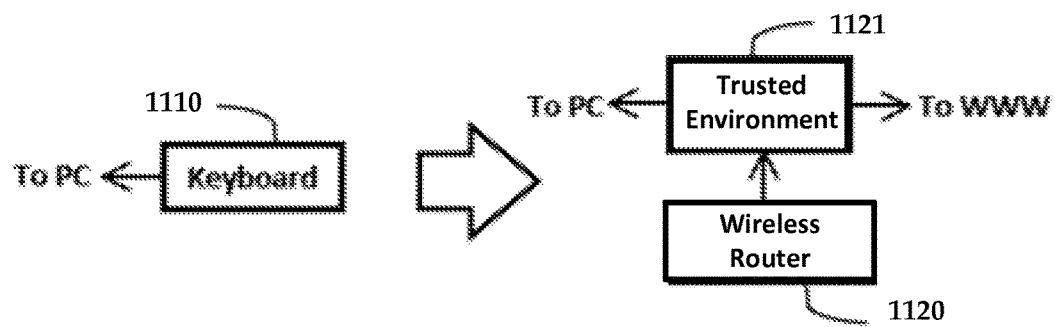
FIG. 11 is a schematic diagram of an example network device, such as a home wireless router (access point) that has been modified by the addition of a trusted computing device therein.

FIG. 11 is an example of the modification of a home wireless router with a trusted environment module. Similar to modifying the keyboard in FIG. 10, other peripherals may be modified to serve as a trusted environment device. In this example, the keyboard 1110 (e.g., legacy device) is modified by adding to it a connection to the trusted environment 1121 for the wireless router 1120. Other peripherals may be connected to the wireless router 1120 via the trusted environment 1121 and allow desired security as designed by the manufacture. In this specific configuration, password protection and other security functions may be implemented.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations can be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

Aspects of the present technology are described above with reference to flowchart illustrations and/or block diagrams of methods, apparatus (systems) and computer program products according to embodiments of the invention. It can be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It can also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A system, comprising:
a legacy environment comprising an off-the-shelf computing system;
a trusted environment hardware device that communicates with a network and the legacy environment;
at least one hardware peripheral communicatively coupled directly with the trusted environment hardware device, the at least one hardware peripheral communicating secure data with the trusted environment hardware device without the legacy environment having access to the secure data, the trusted environment hardware device further communicating the secure data with the network without the legacy environment having access to such data and unsecure data from the at least one hardware peripheral communicating to the legacy environment through the trusted environment hardware device; and wherein the trusted environment hardware device has an output device comprising any of a light emitting diode, a display, a speaker, a network communication device that is external to a computing device or combinations thereof.

2. The system according to claim 1, wherein the trusted environment hardware device comprises a card, such as PCIe/PCI, that is installed in the computing system and is connected to peripherals to support security.

3. The system according to claim 2, wherein the peripherals include any of a keyboard, biometric access device, GPS, and combinations thereof.

4. The system according to claim 1, wherein the trusted environment hardware device is programmed to support security functions.

5. The system according to claim 4, wherein the security functions comprise any of password protection, firewall black/white lists, email contacts, encryption codes, and combinations thereof.

6. The system according to claim 4, wherein the computing system is programmed to support security applications.

7. The system according to claim 6, wherein the security applications comprise any of firewall, encryption, email, navigation, biometric, video and voice conferencing, and combinations thereof.

8. The system according to claim 1, wherein the trusted environment hardware device is an external device, such as USB dongle, that supports security functions.

9. The system according to claim 8, wherein the security functions comprise at least one of user and network authentication, data protection, malware warning, or combinations thereof.

10. The system according to claim 1, wherein the trusted environment hardware device comprises an input means for user authentication.

11. The system according to claim 10, wherein the input means for user authentication comprises any of biometric sensors, camera, microphone, finger print scanner, one or more switches, a keyboard, a touchpad, a trackpad, or combinations thereof.

12. The system according to claim 1, wherein the trusted environment hardware device further comprises an interface to other peripherals and networks.

13. The system according to claim 12, wherein the interface to other peripherals comprises any of a USB, WiFi, Bluetooth, Ethernet, or other network interface.

14. The system according to claim 1, wherein the trusted environment hardware device is incorporated into the at least one hardware peripheral that is connectable to the computing system, the at least one hardware peripheral being configured to serve as the trusted environment hardware device by adding to it a connection to a network to support security functions.

15. The system according to claim 14, wherein the security functions comprise any of password protection, or firewall function.

16. The system according to claim 1, wherein the trusted environment hardware device is incorporated into a network component that connects home or business computing systems or telephones to the Internet, the network component being configured to communicatively couple directly to one or more peripherals to support security functions.

* * * * *